United States Patent [19]
Nagata et al.

[11] Patent Number: 5,959,706
[45] Date of Patent: Sep. 28, 1999

[54] ACTIVE MATRIX SUBSTRATE

[75] Inventors: Hisashi Nagata, Ise; Yoshinori Shimada, Yamatokoriyama; Naofumi Kondo, Ikoma, all of Japan

[73] Assignee: Sharp Kabushiki Kaisha, Osaka, Japan

[21] Appl. No.: 08/580,012

[22] Filed: Dec. 20, 1995

[30] Foreign Application Priority Data

Dec. 27, 1994 [JP] Japan ..................................... 6-325483

[51] Int. Cl.$^6$ .......................... G02F 1/136; G02F 1/1333
[52] U.S. Cl. .............................. 349/110; 349/42; 349/111; 349/43
[58] Field of Search .................................. 349/110, 111, 349/42, 43

[56] References Cited

U.S. PATENT DOCUMENTS

| | | | |
|---|---|---|---|
| 5,426,523 | 6/1995 | Shimada et al. | 359/54 |
| 5,610,736 | 3/1997 | Asai | 349/110 |
| 5,615,028 | 3/1997 | Ishiguro et al. | 349/110 |
| 5,691,782 | 11/1997 | Nishikawa et al. | 349/110 |
| 5,708,483 | 1/1998 | Asia | 349/110 |

FOREIGN PATENT DOCUMENTS

| | | |
|---|---|---|
| 05203994 | 8/1993 | Japan . |
| 5-313197 | 11/1993 | Japan . |
| 6-123894 | 5/1994 | Japan . |

*Primary Examiner*—William L. Sikes
*Assistant Examiner*—Julie Ngo
*Attorney, Agent, or Firm*—Nixon & Vanderhye P.C.

[57] ABSTRACT

An active matrix substrate includes: scanning lines provided on a transparent substrate having an insulating property; a transparent insulating film formed on the scanning lines and the transparent substrate; signal lines provided on the transparent insulating film so as to cross the scanning lines; pixel electrodes provided in areas surrounded by the scanning lines and signal lines having lateral separation between the pixel electrode and the signal electrode; and switching elements connected to the scanning lines, the signal lines and the pixel electrodes, wherein a light-shielding member is provided within the lateral separation, the light-shielding member being located between the transparent substrate and the transparent insulating film.

13 Claims, 6 Drawing Sheets

(PRIOR ART)

005,959,706

ACTIVE MATRIX SUBSTRATE

BACKGROUND OF THE INVENTION

1. Field of the Invention

The present invention relates to a substrate of an active matrix type liquid crystal display device which displays an image by applying driving signals to pixel electrodes via switching elements for display so as to generate a voltage difference between the pixel electrodes and the electrodes opposed thereto.

2. Description of the Related Art

In a conventional active matrix type liquid crystal display device, a plurality of independent pixel electrodes are disposed in a matrix, and a switching element is provided in each of the pixel electrodes. Switching elements connected to a scanning line are selected by a scanning signal provided to the switching elements, and a signal voltage is applied from signal lines to each pixel electrode through the switching element upon application of the scanning signal to the switching elements. A liquid crystal layer interposed between the pixel electrodes and a counter electrode forms a plurality of pixels and each of the pixels is subjected to optical modulation due to the electric potential difference between the pixel electrode and the counter electrode. As a result, the modulation of the plurality of the pixels produces a display pattern. As a switching element for selectively driving the pixels, a thin film transistor (TFT), a MIM (Metal-Insulator-Metal) element and the like are generally used.

In the case where such a display device is used for displaying an image, the signal voltage applied to the pixel electrodes at a certain scanning timing is required to be sufficiently held in the pixel electrodes until the next scanning timing. For this reason, while the switching elements are in an off-state, the pixel electrode and the signal line are required to be electrically isolated by high resistance. In other words, a liquid crystal capacitor consisting of the pixel electrode, the counter electrode and the liquid crystal layer therebetween, and the signal line is required to be electrically isolated by high resistance.

In the case of a transmission type liquid crystal display device, it is necessary for the portions where the pixel electrodes are located to be transparent. Accordingly, a transparent insulating film is used as an insulating film between scanning lines and signal lines, and the pixel electrodes and the signal lines are isolated by the transparent insulating film. As a result, in order to shield light which leaks from the lateral separation between the pixel electrodes and the signal lines, a light-shielding film having light-transmitting portions only in the areas corresponding to the pixel electrodes is provided generally on the counter substrate facing to the active matrix substrate. In view of an error in alignment of the active matrix substrate with the counter substrate occurring during the manufacturing process, the width of the light-shielding portions of the shielding film on the side of the counter substrate is made larger than that of the pixel electrodes. In other words, the area of the light-transmitting portions is smaller than that of the pixel electrodes. This is one of the factors which prevents an aperture ratio of the pixels from improving in the active matrix type display device.

Figure 5:
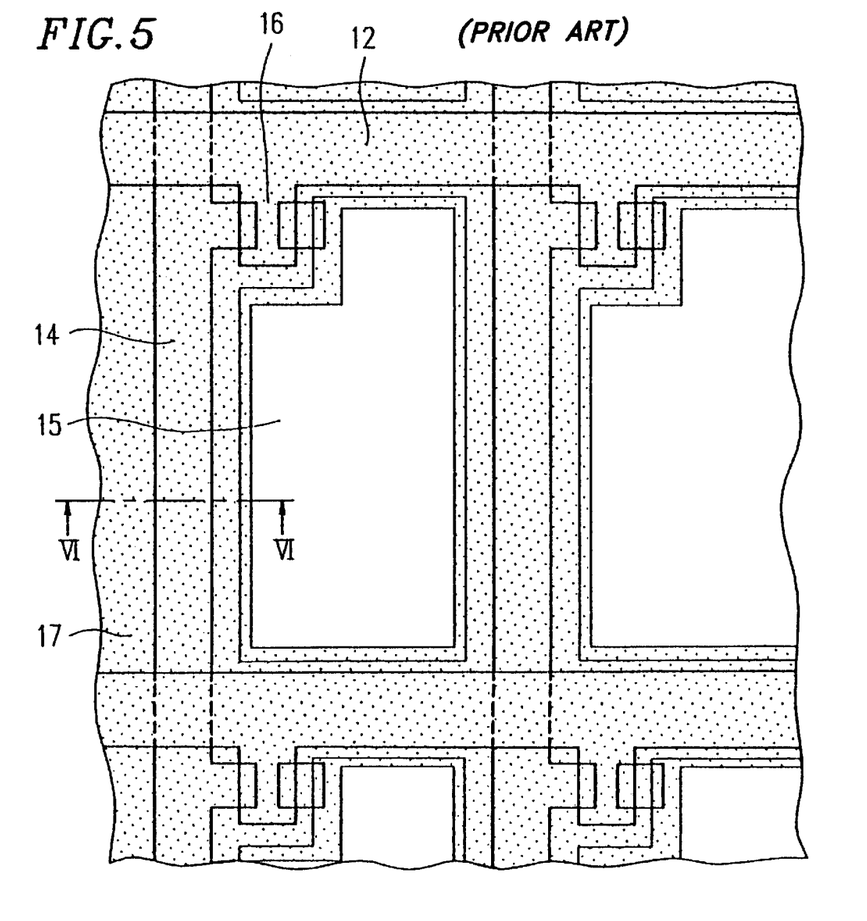
FIG. 5 is a plan view of a primary part showing a first conventional example of a conventional active matrix substrate.
Figure 6:
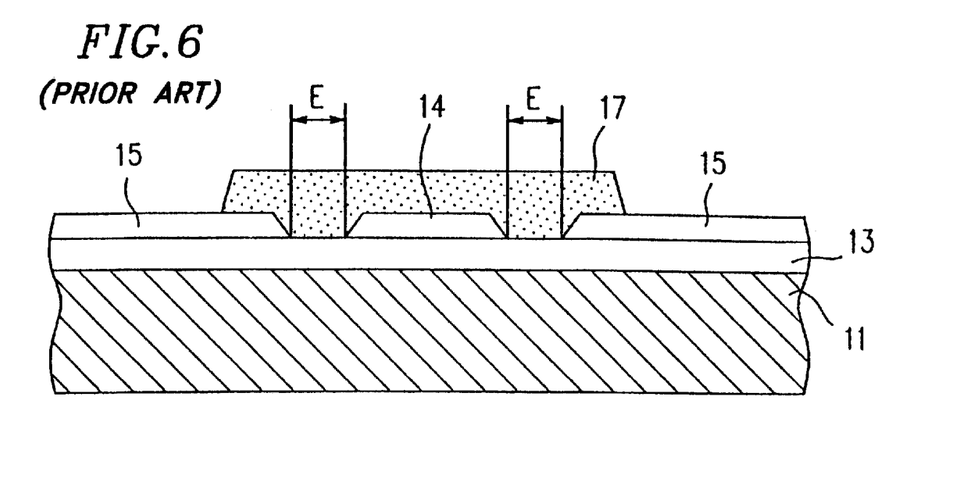
FIG. 6 is a cross sectional view as seen from along the lines VI—VI of FIG. 5.

A first conventional example of an active matrix substrate is constructed as shown in FIGS. 5 and 6. In FIGS. 5 and 6, gate bus lines 12, which are scanning lines, are provided on a glass substrate 11 having an insulation property. A transparent insulating film 13 made of a silicon type compound such as silicon nitride ($SiN_x$), silicon oxide ($SiO_2$) and the like is formed on the gate bus lines 12 and the glass substrate 11. Source bus lines 14, which are signal lines, are provided on the transparent insulating film 13 so as to cross the gate bus lines 12. Pixel electrodes 15 are formed in areas surrounded by both the bus lines 12 and 14. There are lateral separations E between the pixel electrodes 15 and the source bus lines 14 (FIG. 6).

Video signals (signal voltages) supplied from the source bus lines 14 are applied to the pixel electrodes 15 via thin film transistors 16 acting as switching elements. A light-shielding film 17 is provided over the gate bus lines 12, the source bus lines 14 and the lateral separations E, but excluding all but a small portion of the pixel electrodes 15, the small portion being the edge facing toward the source bus line 14.

In the active matrix substrate constructed in such a manner as the first conventional example, light irradiated by a light source (not shown in Figures) from the side of the glass substrate 11 is shielded by the light-shielding film 17 so as not to leak onto the display portion other than the pixel electrodes 15.

In the conventional active matrix substrate, it is intended to prevent light from the light source from the side of the glass substrate 11 from leaking to the display portions other than the portions corresponding to the pixel electrodes 15. However, it is not taken into consideration to prevent light from the light source from the side of glass substrate 11 from being irradiated to the transparent insulating films 13 located in the lateral separations E between the pixel electrode 15 and the source bus lines 14.

Generally speaking, when a semiconductor layer is irradiated with light, a leakage current of the switching element in an off-state is increased due to photo-excitation. As a result, the voltage of the pixel electrodes 15 is not sufficiently maintained, resulting in deterioration in display quality. Therefore, the light-shielding film is provided so as to prevent the switching element from being irradiated with light from the light source for the purpose of preventing poor display quality.

Figure 7:
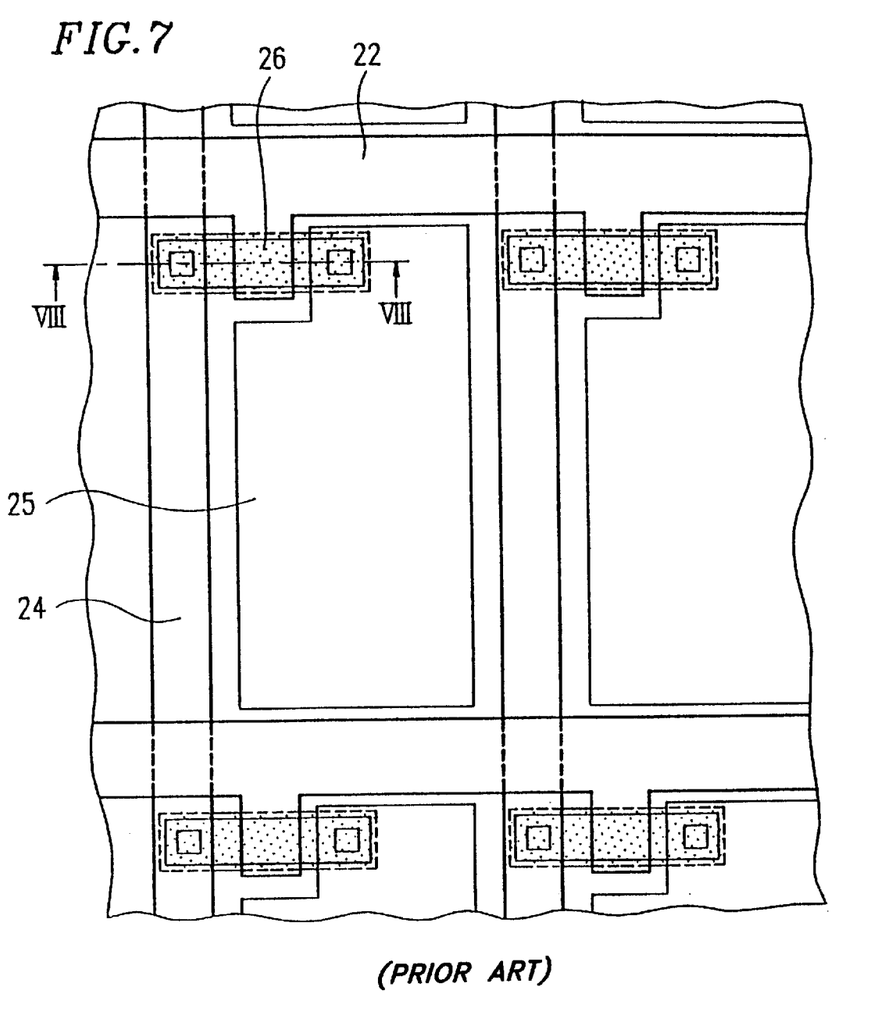
FIG. 7 is a plan view of a primary part showing a second conventional example of a conventional active matrix substrate.
Figure 8:
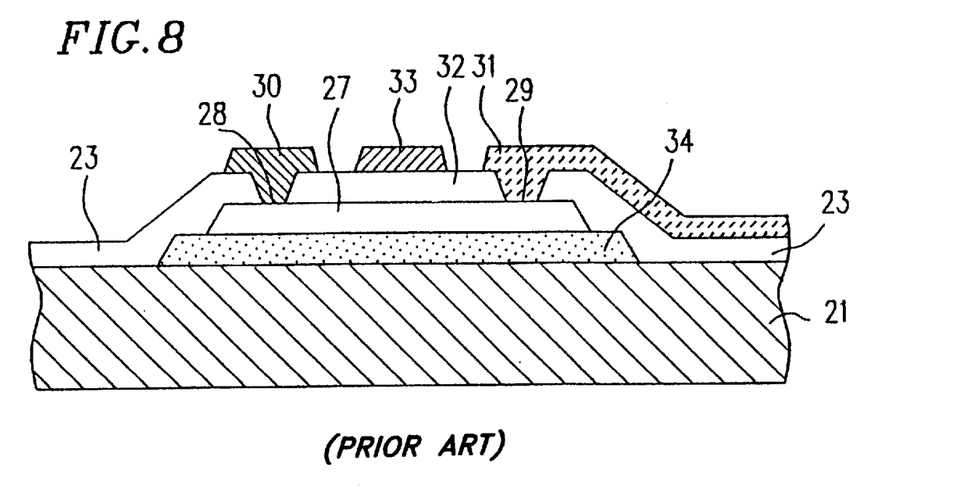
FIG. 8 is a cross sectional view as seen from along the lines VIII—VIII of FIG. 7.

A second conventional example of active matrix substrates is constructed as shown in FIGS. 7 and 8. In FIGS. 7 and 8, gate bus lines 22, which are scanning lines, are provided on a glass substrate 21 having an insulation property. A transparent insulating film 23 made of a silicon type compound such as silicon nitride ($SiN_x$), silicon oxide ($SiO_2$) and the like is formed on the gate bus lines 22 and the glass substrate 21. Source bus lines 24, which are signal lines, are provided on the transparent insulating film 23 so as to cross the gate bus lines 22. Pixel electrodes 25 are formed in areas surrounded by both the bus lines 22 and 24 with predetermined lateral separations between the bus lines 22 and 24 and the pixel electrodes 25.

Video signals delivered from the source bus lines 24 are supplied to the pixel electrodes 25 via thin film transistors 26 acting as switching elements.

The thin film transistor 26 is constructed as shown in FIG. 8. A semiconductor layer 27 is formed between the glass substrate 21 and the transparent insulating film 23. A source contact 28 and a drain contact 29 are formed in portions of the semiconductor layer 27 and a source electrode 30 and a drain electrode 31 are formed on the respective contacts 28 and 29 through openings formed in a predetermined portion of the transparent insulating film 23. A gate electrode 33 is formed on a gate insulating film 32, which is the transparent insulating film located between the source electrode 30 and the drain electrode 31, with a predetermined lateral separation therebetween.

A light-shielding film having a light-shielding portion 34 which is slightly larger than the semiconductor layer 27 is formed between the glass substrate 21 and the semiconductor layer 27.

In the active matrix substrate constructed in such a manner as the second conventional example, light irradiated by a light source (not shown in Figures) from the side of the glass substrate 21 to the semiconductor layer 27 is shielded by the light-shielding film 34.

However, the inventors of the present invention have noticed the following problems. In the active matrix substrate constructed in such a manner as described above, silicon type compound such as silicon nitride, silicon oxide and the like is used as the material for the transparent insulating films 13 and 23. In the case of such transparent insulating films 13 and 23, the microstructure (crystal structure) of the transparent insulating films 13 and 23 are changed, or an abnormal energy level generated on the surfaces of transparent insulating films 13 and 23, due to the difference in film-forming conditions and contamination by different elements. As a result, the insulating property of the transparent insulating film is deteriorated. In the case where such defects exist in the transparent insulating films 13 and 23, particularly, when the portions having the defects are irradiated with light, electrons in the transparent insulating films 13 and 23 are excited by the light irradiation (photo-excitation). As a result, the insulating property of the transparent insulating films deteriorates in accordance with the intensity of the light. Thus preventing charges from being sufficiently retained at the pixel electrodes 15 and 25. Accordingly, an image of high quality cannot be obtained.

It is known that when the transparent insulating films 13 and 23 are continuously irradiated with intense light, the microstructure of the transparent insulating films 13 and 23 deteriorates and the inherent properties thereof are deteriorated. In the case of the transparent insulating films 13 and 23, this causes the deterioration in the insulating property, leading to the deterioration in display quality such as the deterioration in display contrast and the like. In particular, when used in a liquid crystal projection display apparatus or the like, a liquid crystal panel including the active matrix substrate is exposed to high intensity light. Thus, the deterioration of the transparent insulating films 13 and 23 due to such light causes a severe problem in terms of durability and reliability.

SUMMARY OF THE INVENTION

The active matrix substrate of this invention, includes: scanning lines provided on a transparent substrate having an insulating property; a transparent insulating film formed on the scanning lines and the transparent substrate; signal lines provided on the transparent insulating film so as to cross the scanning lines; pixel electrodes provided in areas surrounded by the scanning lines and signal lines having lateral separation between the pixel electrode and the signal electrode; and switching elements connected to the scanning lines, the signal lines and the pixel electrodes, wherein a light-shielding member is provided within the lateral separation, the light-shielding member being located between the transparent substrate and the transparent insulating film.

In one embodiment of the invention, the light-shielding member is formed of the same kind of a metal material as the scanning lines.

In another embodiment of the invention, the light-shielding member continuously extends under the signal line between adjacent pixel electrodes.

In still another embodiment of the invention, the active matrix substrate further includes another light-shielding member formed between the transparent substrate and a semiconductor layer for the switching element.

According to one aspect of the present invention, by shielding light irradiated by the light source or the like from the side of the transparent substrate toward the direction of the transparent insulating film in the lateral separation between the signal lines and the pixel electrodes by the light-shielding members, even when the transparent insulating film has some defects, poor quality in display can be prevented because the transparent insulating film in the lateral separation is not exposed to light. Even in the case where a liquid crystal panel including the active matrix substrate is exposed to high intensity light, such as when used in a projection type display apparatus, display quality is not deteriorated because the insulating property of the transparent insulating film is not deteriorated. Thus, the problems in terms of durability or reliability caused by the deterioration in the transparent insulating film can be resolved.

In addition, by providing the light-shielding member between the glass substrate and the transparent insulating film in the lateral separation, light leaking from the portions other than pixel electrodes to display portions can be shielded, and it is not necessary that the width of the light-shielding member is large because of an error of alignment with the counter substrate. Thus, an aperture ratio of the pixels can be improved.

Further, in the above structure, by forming the light-shielding member of the same kind of metal as the scanning lines, the formation of the light-shielding member and the scanning lines is conducted in the same step. Thus, an additional step is not required.

Furthermore, according to one example of the invention, the light-shielding member provided between the transparent substrate continuously extends under the signal line between adjacent pixel electrodes. Therefore, the number of light-shielding portions is reduced and the number of the portions necessary for alignment in a manufacturing step is reduced. Thus, the light-shielding member can be easily patterned.

Thus, the invention described herein makes possible the advantages of (1) preventing poor quality in display even if the transparent insulating film includes defects, (2) preventing the deterioration in display quality and resolving the problems in terms of durability and reliability caused by the deterioration in the transparent insulating film, when the panel is exposed to intense light in such a case where it is used for projection, or the like, and (3) improving an aperture ratio of the active matrix type display device.

These and other advantages of the present invention will become apparent to those skilled in the art reading and understanding the following detailed description with reference to the accompanying figures.

DESCRIPTION OF THE PREFERRED EMBODIMENTS

Example 1

Hereinafter, an active matrix substrate of the present invention will be described by way of examples with reference to FIGS. 1 through 4.

Figure 1:
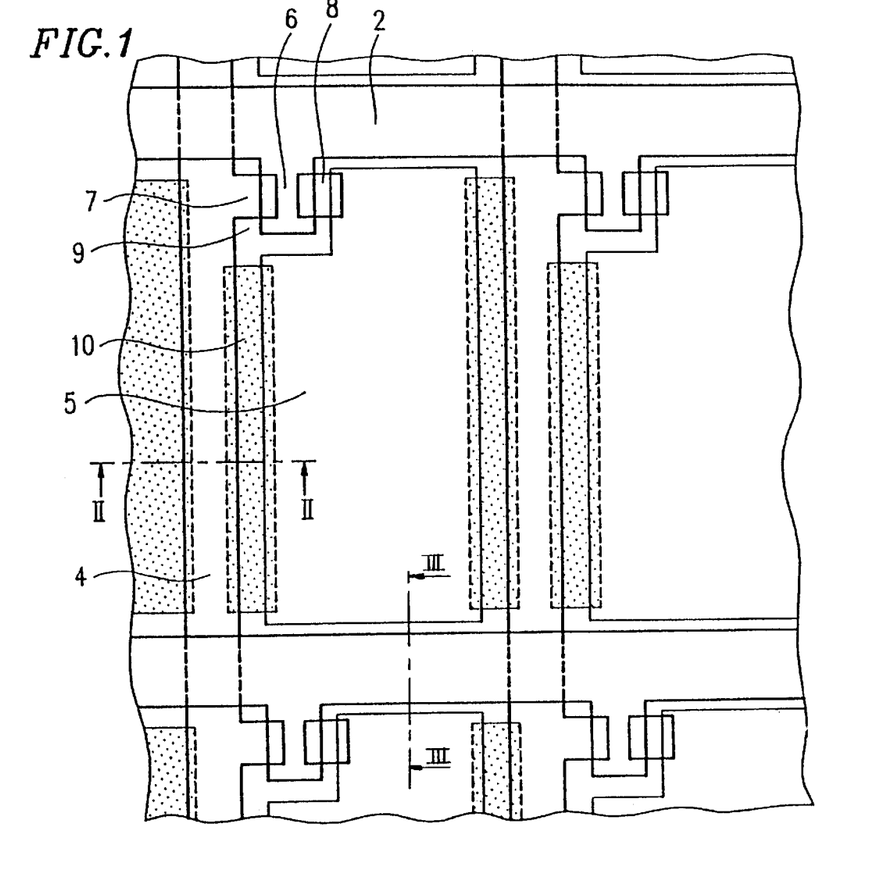
FIG. 1 is a plan view of a primary part showing a first example of an active matrix substrate of the present invention.
Figure 2A:
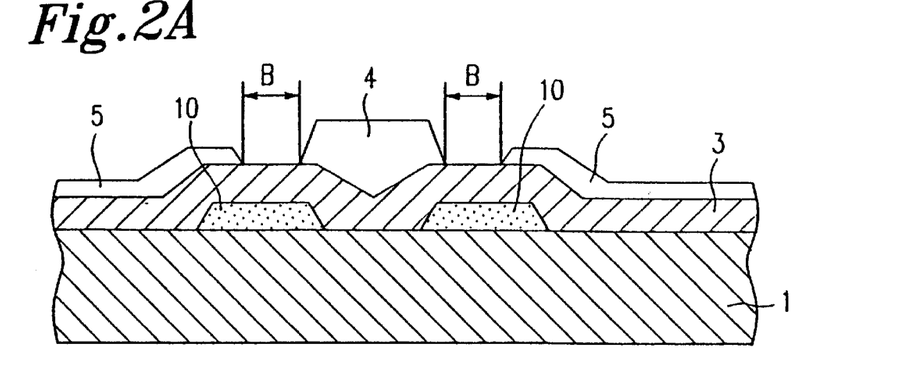
FIG. 2A is a cross sectional view as seen from along the lines II—II of FIG. 1.
Figure 2B:
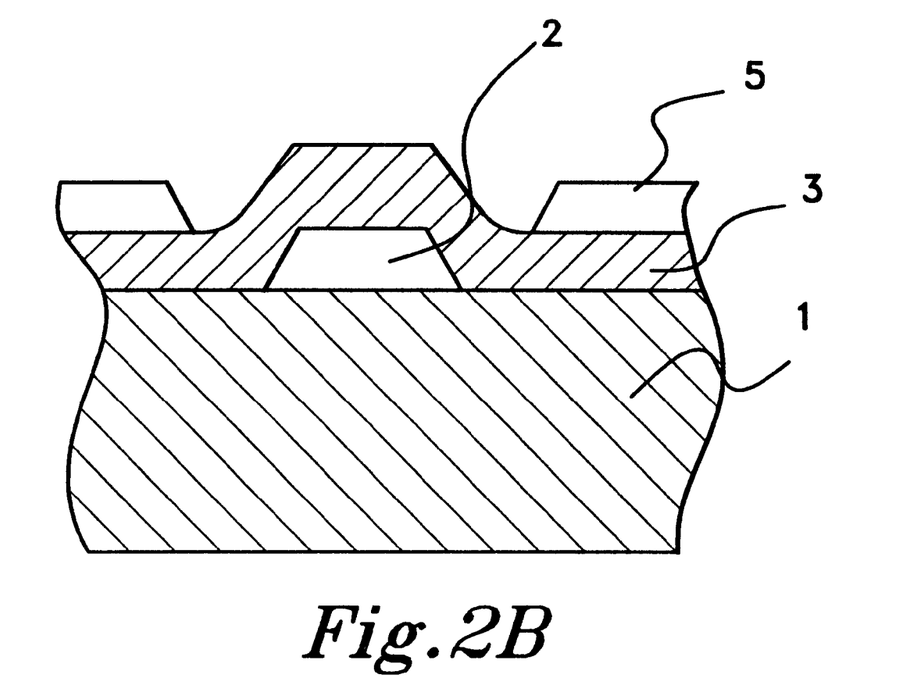
FIG. 2B is a cross-sectional view as seen from along the lines III—III of FIG. 1.

A first example of the active matrix substrate of the present invention is constructed as shown in FIGS. 1A and 2B. In FIGS. 1 and 2, gate bus lines 2, which are scanning lines, are provided on a glass substrate 1 having an insulating property. A transparent insulating film 3 is formed on the gate bus lines 2 and the glass substrate 1. Source bus lines 4 are provided on the transparent insulating film 3 so as to cross the gate bus lines 2.

Pixel electrodes 5 are formed in the area surrounded by the gate bus lines 2 and the source bus lines 4 (in a matrix) with lateral separations B. Thin film transistors (TFTs) 9 acting as switching elements are formed adjacent to the pixel electrodes 5 in the vicinity of the portion where the gate bus lines 2 and the source bus lines 4 cross each other. Branch lines of the gate bus lines 2 are formed as gate electrodes 6 and branch lines of the source bus lines 4 are formed as source electrodes 7. Drain electrodes of the TFTs 9 are electrically connected to the pixel electrodes 5. A light-shielding film having light-shielding portions 10 is provided between the glass substrate 1 and the transparent insulating film 3 in the lateral separations B. Hereinafter, the entire film including a plurality of light-shielding portions 10 is referred to as a light-shielding film.

Next, a process for producing the first example of the active matrix substrate of the present invention produced in such a manner as described above will be described.

First, a glass substrate 1 having the insulating property or a glass substrate whereon an insulating film such as a tantalum oxide film ($Ta_2O_5$), a silicon oxide film ($SiO_2$) or the like is formed as the base coat film should be prepared.

Then, a single layer or a multi-layer of aluminum (Al), molybdenum (Mo), tantalum (Ta) or the like is deposited by a sputtering method, and a patterning is performed so as to obtain a predetermined pattern. As a result, gate bus lines 2 and light-shielding portions 10 are formed simultaneously. The light-shielding portions 10 extending perpendicular to the gate bus lines 2 are provided between the gate bus lines 2 so that the width of the shorter side of the light-shielding portions is 5 $\mu$m, the lateral separations between the light-shielding portions 10 are alternately 8 $\mu$m and 100 $\mu$m. Thereafter, an oxide film may be formed on the surfaces of the gate bus lines 2. This oxide film may be formed by an anodic oxidization method.

Next, a silicon nitride ($SiN_x$) layer for a transparent insulating film 3 functioning as a gate insulating film, an amorphous silicon layer for a channel layer of thin film transistors 9 and a silicon nitride layer for a channel protecting film are sequentially deposited using a plasma CVD method. Then, the channel protecting film is patterned. At this step, the channel protecting film may be patterned by self-alignment using a gate electrode 6, Furthermore, n-type silicon ($n^+Si$) for a channel layer and a contact layer between a source electrode 7 and a drain electrode 8 is deposited on the entire surface. At the same time, patterning of an amorphous silicon layer is performed, so as to form the channel layer and the contact layer. Then, a single layer film or a multi-layer film made of a metal such as aluminum, tantalum, or the like is deposited on the entire surface by a sputtering method. Thereafter, source bus lines 4 are patterned so as to cover the lateral separations of 8 $\mu$m between the light-shielding portions 10. In the first example described above, tantalum is used, and the source bus lines 4 of 10 $\mu$m wide are formed. After this process, oxide layer may be formed on the surfaces of the source bus lines 4. This oxide layer may be formed by an anodic oxidation method.

Next, an ITO (Indium Tin Oxide) film functioning as a pixel electrode 5 and one electrode as a storage capacitor, is deposited by a sputtering method. The storage capacitor is a capacitor provided for improving the charge holding characteristic of the liquid crystal capacitor and is provided in parallel to the liquid crystal capacitance, if necessary. Then, patterning is performed so as to cover the lateral separations of 100 $\mu$m between the light-shielding portions 10. Alternatively, an insulating film made of silicon nitride or the like may be deposited as a protecting film on the entire surface.

In the active matrix substrate constructed in such a manner as in the first example, light irradiated by the light source or the like from the side of the glass substrate 1 to the transparent insulating film 3 in the lateral separations B is shielded by the light-shielding portions 10. Thus, it is possible to reduce the amount of current which leaks through the transparent insulating film 3 due to an abnormal energy level generated by the difference in film forming conditions or contamination by different elements. Even if the transparent insulating film 3 has some defects, poor quality in display can be prevented because the transparent insulating film 3 in the lateral separations B is not exposed to light. In the case where a liquid crystal panel is exposed to high intensity light, such as when used in a projection display apparatus, display quality is not deteriorated because the insulating property of the transparent insulating film 3 is not deteriorated by light irradiation. Thus, the problems in terms of durability or reliability caused by the deterioration in the transparent insulating film can be solved.

In addition, by providing the light-shielding portions 10 in the lateral separation B between the glass substrate 1 and the transparent insulating film 3, light leaking from the portions other than pixel electrodes to display portions can be shielded. Therefore, it is not necessary that the width of the light-shielding portion should be large because of an error of alignment with the counter substrate. Thus, an aperture ratio of the pixels can be enlarged.

Example 2

Figure 3:
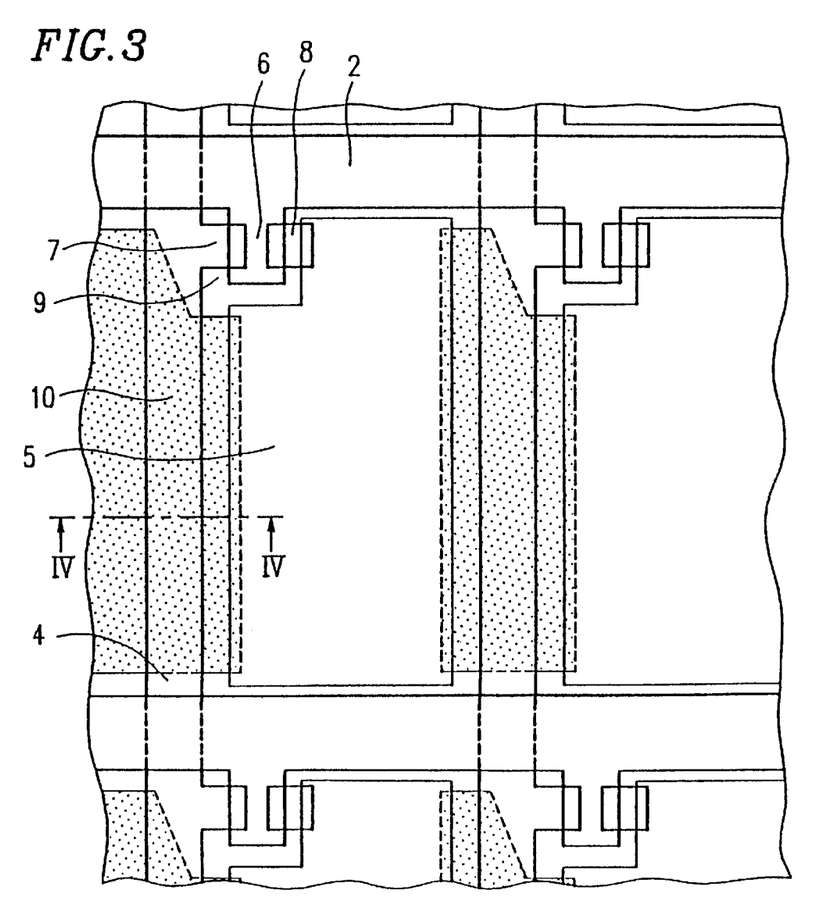
FIG. 3 is a plan view of a primary part showing a second example of an active matrix substrate of the present invention.
Figure 4:
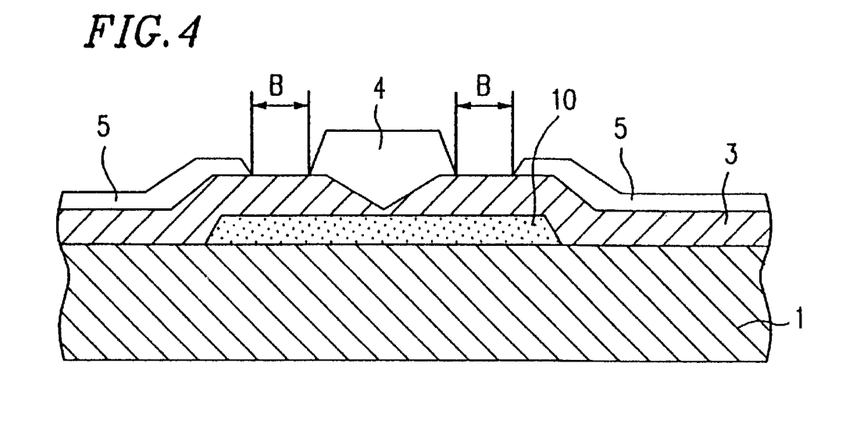
FIG. 4 is a cross sectional view as seen from along the lines IV—IV of FIG. 3.

A second example of the active matrix substrate of the present invention is constructed as shown in FIGS. 3 and 4. The same reference numeral in the second example as in the first example denotes the same portion as in the first example, and the description thereof will be omitted.

The active matrix substrate shown in FIGS. 3 and 4 has light-shielding portions 10 formed within the lateral separation E between the glass substrate 1 and the transparent insulating film 3 as is described in the first example. However, the structure in FIGS. 3 and 4 differs from that of the first example, in that a light-shielding portion 10 continuously extends under the signal line 4 between the adjacent pixel electrodes 5. That is, a light-shielding portion 10 of the light-shielding film is provided so that the light-shielding portion 10 reaches both of the peripheral portions of the two pixel electrodes 5 interposing the source bus line.

In the active matrix substrate constructed in such a manner as in the second example, the number of light-shielding portions is reduced. Thus, the number of the portions necessary for alignment in a manufacturing step is reduced, compared with Example 1. Accordingly, in addition to the effects obtained by the first example, there is another effect that the light-shielding portions 10 can be easily patterned.

Although the gate bus lines 2 and the light-shielding portions 10 are simultaneously formed of the same kind of metal film, they are not limited to those used in the above examples, but may be formed of different films. In the case where it is not necessary to form the light-shielding portions with the gate bus lines, the light shielding portions may be formed so as to prevent the switching element as well as the insulating film in the lateral separation between the pixel electrodes and the signal electrodes. That is, the light-shielding portions 10 shown in FIGS. 1 to 4 and the light-shielding portion 34 shown in FIG. 8 may be formed simultaneously. Moreover, the light-shielding portion 10, which is formed in the lateral separation between the pixel electrodes and the signal electrodes, may continuously extend under the switching element so that the light-shielding portion prevent the switching element from being irradiated with light.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate including: scanning lines provided on a transparent substrate having an insulating property; a transparent insulating film formed on the scanning lines and the transparent substrate; signal lines provided on the transparent insulating film formed so as to cross the scanning lines; pixel electrodes provided in areas surrounded by the scanning lines and signal lines, wherein lateral separations are present between each pixel electrode and the signal lines adjacent thereto; and switching elements connected to the scanning lines, the signal lines and the pixel electrodes, wherein distinct light-shielding members are located between the transparent substrate and the transparent insulating film, each distinct light-shielding member being provided under a corresponding one of the lateral separations and each distinct light-shielding member being isolated from other distinct light-shielding members.

2. An active matrix substrate according to claim 1, wherein lines are formed from a metal material.

3. An active matrix substrate according to claim 2, wherein each distinct light-shielding member is formed of the same kind of metal material as the scanning lines.

4. An active matrix substrate according to claim 3, wherein the metal material is selected from the group consisting of aluminum, molybdenum and tantalum.

5. An active matrix substrate according to claim 1, wherein each distinct light-shielding member extends continuously under a respective switching element, each distinct light-shielding member being formed between the transparent substrate and a semiconductor layer for the switching element.

6. An active matrix substrate including: scanning lines provided on a transparent substrate having an insulating property; a transparent insulating film formed on the scanning lines and the transparent substrate; signal lines provided on the transparent insulating film formed so as to cross the scanning lines; pixel electrodes provided in areas surrounded by the scanning lines and signal lines, wherein lateral separations are present between each pixel electrode and the signal lines adjacent thereto; and switching elements connected to the scanning lines, the signal lines and the pixel electrodes, wherein distinct light-shielding members are located between the transparent substrate and the transparent insulating film, each distinct light-shielding member being provided under a corresponding one of the lateral separations, and wherein each distinct light-shielding member is completely located between two adjacent scanning lines and is isolated from other distinct light-shielding members.

7. An active matrix substrate including: scanning lines provided on a transparent substrate having an insulating property; a transparent insulating film formed on the scanning lines and the transparent substrate; signal lines provided on the transparent insulating film formed so as to cross the scanning lines; pixel electrodes provided in areas surrounded by the scanning lines and signal lines, wherein lateral separations are present between each pixel electrode and the signal lines adjacent thereto; and switching elements connected to the scanning lines, the signal lines and the pixel electrodes, wherein distinct light-shielding members are located between the transparent substrate and the transparent insulating film, each distinct light-shielding member being provided under a corresponding one of the lateral separations, and wherein the distinct light-shielding members are independent from the signal lines and each distinct light-shielding member is isolated from other distinct light-shielding members.

8. An active matrix substrate including: scanning lines provided on a transparent substrate having an insulating property; a transparent insulating film formed on the scanning lines and the transparent substrate; signal lines provided on the transparent insulating film formed so as to cross the scanning lines; pixel electrodes provided in areas surrounded by the scanning lines and signal lines, wherein lateral separations are present between each pixel electrode and the signal lines adjacent thereto; and switching elements connected to the scanning lines, the signal lines and the pixel electrodes;

wherein one of a plurality of light-shielding members is provided under each signal line and the lateral separations adjacent thereto, each light-shielding member being located between the transparent substrate and the transparent insulating film, and wherein each light-shielding member is completely located between two adjacent scanning lines and is isolated from other light-shielding members.

9. An active matrix substrate according to claim 8, wherein the scanning lines are formed from a metal material.

10. An active matrix substrate according to claim 9, wherein each light-shielding member is formed of the same kind of metal material as the scanning lines.

11. An active matrix substrate according to claim 10, wherein each metal material is selected from the group consisting of aluminum, molybdenum and tantalum.

12. An active matrix substrate according to claim 8, wherein the light-shielding member extends continuously under the switching element, each light-shielding member being formed between the translucent substrate and a semiconductor layer for the switching element.

13. An active matrix substrate including: scanning lines provided on a transparent substrate having an insulating property; a transparent insulating film formed on the scanning lines and the transparent substrate; signal lines provided on the transparent insulating film formed so as to cross the scanning lines; pixel electrodes provided in areas surrounded by the scanning lines and signal lines, wherein lateral separations are present between each pixel electrode and the signal lines adjacent thereto; and switching elements connected to the scanning lines, the signal lines and the pixel electrodes, wherein distinct light-shielding members are located between the transparent substrate and the transparent insulating film, each distinct light-shielding member being provided under a corresponding one of the lateral separations and being isolated from other distinct light-shielding members, and wherein the transparent insulating film is formed of $SiN_x$.

* * * * *